(12) United States Patent
Huntzinger et al.

(10) Patent No.: US 11,999,507 B2
(45) Date of Patent: *Jun. 4, 2024

(54) LANDING ZONE INDICATORS

(71) Applicant: Kitty Hawk Corporation, Palo Alto, CA (US)

(72) Inventors: Timothy Robert Huntzinger, Valencia, CA (US); Dennis Young Kwon, San Jose, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,827

(22) Filed: Apr. 4, 2023

(65) Prior Publication Data

US 2023/0382559 A1 Nov. 30, 2023

Related U.S. Application Data

(63) Continuation of application No. 17/329,476, filed on May 25, 2021, now Pat. No. 11,649,068, which is a continuation of application No. 16/942,487, filed on Jul. 29, 2020, now Pat. No. 11,046,457.

(51) Int. Cl.
*B64F 1/20* (2006.01)
*G08G 5/00* (2006.01)
*G08G 5/02* (2006.01)

(52) U.S. Cl.
CPC ............. *B64F 1/20* (2013.01); *G08G 5/0026* (2013.01); *G08G 5/025* (2013.01)

(58) Field of Classification Search
CPC ........ B64D 45/00; B64D 45/04; B64D 45/06; B64F 1/18; B64F 1/20; G05D 1/0044
See application file for complete search history.

(56) References Cited

U.S. PATENT DOCUMENTS

| | | |
|---|---|---|
| 4,241,604 A | 12/1980 | Hergenrother |
| 4,272,799 A | 6/1981 | Downing |
| 5,335,112 A * | 8/1994 | Bennett ................. G02B 5/124 |
| | | 359/530 |
| 5,986,581 A | 11/1999 | Magdaleno, II |
| 6,193,190 B1 * | 2/2001 | Nance ...................... B64F 1/20 |
| | | 244/114 R |
| 6,280,057 B1 | 8/2001 | O'Meara |
| 6,320,516 B1 | 11/2001 | Reason |
| 6,509,844 B1 | 1/2003 | Eyring |
| 6,517,026 B1 * | 2/2003 | Smith ..................... B64C 37/00 |
| | | 244/50 |
| 8,933,820 B1 | 1/2015 | Tyson |
| 9,457,916 B2 | 10/2016 | McDermott |
| 9,701,425 B2 | 7/2017 | Lee |
| 10,176,378 B1 | 1/2019 | Boyd |
| 10,633,115 B2 | 4/2020 | Pilskalns |
| 10,723,482 B1 | 7/2020 | Salesse-Lavergne |

(Continued)

*Primary Examiner* — Hoi C Lau
(74) *Attorney, Agent, or Firm* — Van Pelt, Yi & James LLP

(57) ABSTRACT

A landing zone indicator system which includes a battery that is configured to power a controller and a human vision output device, a controller that is configured to control human-visible light that is output by the human vision output device, and a human vision output device where the human-visible light output by the human vision output device generates an illuminated landing zone for a vertical takeoff and landing (VTOL) vehicle.

16 Claims, 5 Drawing Sheets

(56) References Cited

U.S. PATENT DOCUMENTS

| | | |
|---|---|---|
| 10,773,825 B1 | 9/2020 | Kiel |
| 11,046,457 B1* | 6/2021 | Huntzinger ............... B64F 1/20 |
| 11,649,068 B2* | 5/2023 | Huntzinger ............... B64F 1/20 |
| | | 340/953 |
| 2002/0105805 A1 | 8/2002 | O'meara |
| 2003/0133291 A1 | 7/2003 | Williams |
| 2005/0084975 A1 | 4/2005 | Armentrout |
| 2011/0174925 A1 | 7/2011 | Ying |
| 2013/0014790 A1 | 1/2013 | Van Gerpen |
| 2013/0021172 A1 | 1/2013 | Boedeker |
| 2013/0141255 A1 | 6/2013 | McDermott |
| 2014/0009264 A1 | 1/2014 | Song |
| 2015/0130644 A1 | 5/2015 | Kiel |
| 2015/0323932 A1 | 11/2015 | Paduano |
| 2016/0009413 A1 | 1/2016 | Lee |
| 2016/0045386 A1 | 2/2016 | Sandler |
| 2016/0068264 A1 | 3/2016 | Ganesh |
| 2016/0280393 A1* | 9/2016 | Mouton ................ B64D 45/08 |
| 2016/0310341 A1 | 10/2016 | Yu |
| 2016/0321921 A1 | 11/2016 | Stafford |
| 2017/0045894 A1 | 2/2017 | Canoy |
| 2017/0129603 A1 | 5/2017 | Raptopoulos |
| 2017/0320593 A1* | 11/2017 | Van Beest ................ B64F 1/20 |
| 2018/0126897 A1 | 5/2018 | Hamada |
| 2018/0173245 A1 | 6/2018 | Twining |
| 2018/0357910 A1 | 12/2018 | Hobbs |
| 2019/0127083 A1 | 5/2019 | Di Benedetto |
| 2019/0248511 A1* | 8/2019 | Lewis .................... H05B 45/00 |
| 2019/0339720 A1 | 11/2019 | Petersen |
| 2020/0010214 A1 | 1/2020 | Newcomb |
| 2020/0026309 A1 | 1/2020 | Ma |
| 2020/0073412 A1* | 3/2020 | McNair .................. G05D 1/102 |
| 2020/0130864 A1 | 4/2020 | Brockers |
| 2020/0211403 A1 | 7/2020 | Goodman |
| 2020/0239138 A1 | 7/2020 | Raptopoulos |
| 2020/0247557 A1 | 8/2020 | Salesse-Lavergne |
| 2020/0369202 A1 | 11/2020 | Ching |
| 2022/0033104 A1* | 2/2022 | Huntzinger ............ G08G 5/025 |
| 2023/0382559 A1* | 11/2023 | Huntzinger ............ B64D 45/08 |

* cited by examiner

Landing Zone Indicator 1

Landing Zone Indicator 2

LANDING ZONE INDICATORS

CROSS REFERENCE TO OTHER APPLICATIONS

This application is a continuation of U.S. patent application Ser. No. 17/329,476, entitled LANDING ZONE INDICATORS filed May 25, 2021, which is a continuation of U.S. patent application Ser. No. 16/942,487, now U.S. Pat. No. 11,046,457, entitled LANDING ZONE INDICATORS filed Jul. 29, 2020, each of which is incorporated herein by reference for all purposes.

BACKGROUND OF THE INVENTION

New types of aircraft are being developed which may permit personal transportation to and from locations outside of airports. One such new type of aircraft is an ultralight, single-seat aircraft that takes off and lands vertically. Such vehicles do not require a long runway and the small size of the vehicle makes it suitable for use in urban and/or more densely populated areas where runways cannot be built. New systems which help such new vehicles operate in new environments (e.g., assisting with the safety and/or management of the vehicles) would be desirable.

BRIEF DESCRIPTION OF THE DRAWINGS

Various embodiments of the invention are disclosed in the following detailed description and the accompanying drawings.

DETAILED DESCRIPTION

Figure 1A:
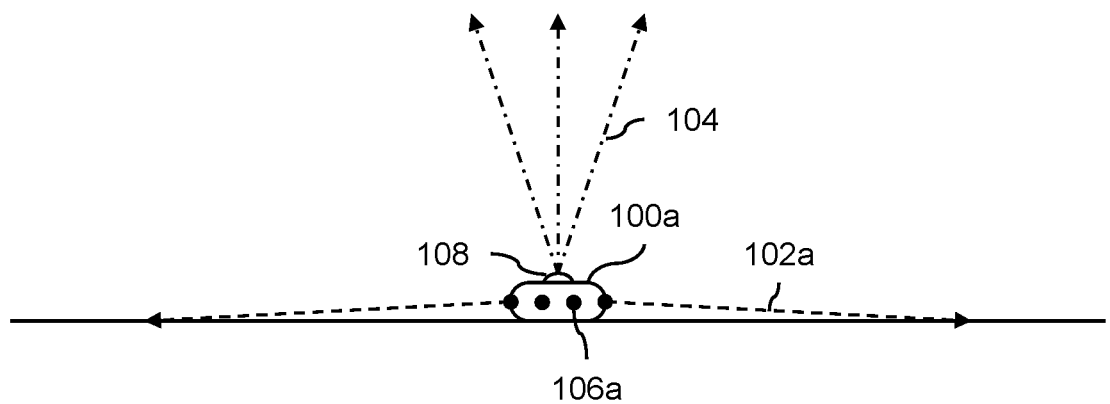
FIG. 1A is a diagram illustrating an embodiment of an on-the-ground landing zone indicator viewed from the side.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a landing zone indicator are described herein. In some embodiments, a landing zone indicator includes a battery where the battery is configured to power a controller and a human vision output device. For example, the landing zone indicator may be a portable and battery-powered landing zone indicator that is placed on the ground which permits such a landing zone indicator to be deployed quickly and easily to set up a landing zone, even in locations where there is no infrastructure and/or easy access to power (e.g., a parking lot, a park or field, etc.) and/or without altering or digging the ground in that area (e.g., for power lines, to install recessed lights in the ground, etc.). Alternatively, in some embodiments the landing zone indicator is located on the underside of the vehicle and the battery is the vehicle's (e.g., onboard) battery.

In some embodiments, a landing zone indicator system further includes a controller that controls the human-visible light that is output by the human vision output device. For example, a controller in an on-the-ground landing zone indicator may automatically communicate with an (electric) vertical takeoff and landing ((e)VTOL) vehicle and automatically turn on the human vision output device (e.g., going from a standby power state to a fully-powered or light-emitting state when the vehicle is sufficiently close to the landing zone indicator or an intention to land at the associated landing zone has been communicated).

In some embodiments, a landing zone indicator system further includes a human vision output device (e.g., a lightbulb or other light-emitting device such as a laser, an LED, etc.), where the human-visible light output by the human vision output device illuminates, defines, creates, or otherwise generates an illuminated landing zone for an (e)VTOL vehicle. For example, the human-visible light may illuminate or otherwise demark the landing zone to help a pilot in the vehicle or a person on the ground know where the landing zone is located so that the pilot can land within the boundaries of the landing zone and/or the person on the ground can get out of the landing zone. Without the landing zone indicator, there may be no other indication of where the landing zone is located and/or where the vehicle should land.

In some embodiments, a landing zone indicator is coupled or otherwise attached to the underside of an (e)VTOL vehicle. For clarity, some landing zone indicators are referred to herein as on-the-ground landing zone indicators whereas others are referred to as vehicle-mounted landing zone indicators. Like an on-the-ground landing zone indicator, a vehicle-mounted landing zone indicator may help to better illuminate the landing zone for a pilot in the vehicle, or let a person on the ground know where the vehicle will land and get out of the landing zone. In various embodiments, on-the-ground landing zone indicators and vehicle-mounted landing zone indicators are used separately or in combination with each other.

As will be described in more detail below, some (e)VTOL vehicles may have some clearance beneath the fuselage when the vehicle is on the ground. As such, in at least some applications, an on-the-ground landing zone indicator does not need to be flush with the ground to prevent damage to the vehicle or the landing zone indicator if a vehicle were to land on top of the landing zone indicator. Similarly, if the landing zone indicator is an on-vehicle landing zone indicator, the clearance beneath the fuselage permits the landing zone indicator to be attached to that surface, if desired.

In some embodiments, an on-the-ground landing zone indicator includes a computer vision output device that is configured to output a signal that is received by a receiver on the vehicle and/or aids autonomous flight. For example, the output signal may be infrared light that helps to indicate the location of the landing zone for the vehicle and/or the autonomous flight controller on the vehicle. For simplicity and ease of explanation, some examples described herein may show landing zone indicators that output human-visible light as well as computer vision signals but naturally they may be used or implemented separately.

FIG. 1A is a diagram illustrating an embodiment of an on-the-ground landing zone indicator viewed from the side. In the example shown, a portable and battery-powered landing zone indicator (100a) is placed on the ground and outputs human-visible signals (102a), such as human-visible light, and computer vision signals (104), such as infrared signals. In this example, human vision output components (106a) ring the sides of the landing zone indicator (100a). For example, the human vision output components (106a) may be LEDs or other devices that output or otherwise emit light in the spectrum visible to humans. In this example, the human vision output components (106a) are angled slightly downward so that the human-visible signals that are output illuminate a circle around the landing zone indicator (100a). This may help a pilot in the vehicle locate the landing zone and land the vehicle (e.g., vertically) in the landing zone illuminated or otherwise indicated by the light from the landing zone indicator. For people on the ground, the circular landing zone that is illuminated by the human vision output components (106a) may warn a person that a vehicle is about to land and whether or not they are outside or inside the landing zone and correspondingly whether they are in a safe location or not, respectively.

In this example, the computer vision output component (108) is located on the top of the landing zone indicator (100a). The computer vision signals (104) help computer vision receivers and/or components in the vehicle locate the landing zone. Depending upon how the vehicle is flown (e.g., autonomous flight versus piloted flight), the computer vision signals (104) may be used in a variety of ways. For example, if the vehicle is flown autonomously then in one example an autonomous flight controller uses the computer-visible signals to detect when the vehicle is above a landing zone indicator, stop (e.g., hover in-air), and then perform a vertical landing on top of the landing zone indicator. For example, although GPS or radio-based navigation may help an autonomous flight controller get close to the landing zone, urban canyons and/or less-than-desirable GPS and/or radio-based resolution may make it difficult to land vehicles (e.g., especially in urban areas) without the aid of a landing zone indicator which outputs computer-visible signals.

Alternatively, if the vehicle is controlled by a pilot, the computer-visible signals (104) may be presented or otherwise displayed to the pilot (e.g., via a display or other user interface). In one example, the computer-visible signals are used to indicate to a pilot when the vehicle is properly above the landing zone indicator. A display in the cockpit may either indicate "in place for landing" or "not in place for landing" so the pilot knows when to stop or whether to keep moving the vehicle, respectively. This may, for example, be based on whether or to what degree or amount the computer-visible signals (104) hit some sensor or receiver on the underside of an (e)VTOL vehicle. Once the (e)VTOL vehicle is properly positioned over the on-the-ground landing zone indicator, the pilot may switch over to an autonomous landing mode.

In some embodiments, when a pilot is attempting to position a VTOL vehicle above the landing zone and before the vertical landing is performed, the computer-visible signals are used to provide feedback to the pilot (e.g., to help them maneuver into a position above the center of the illuminated landing zone) in the form of haptic feedback via a joystick or other hand control. For example, a degree or amount of vibration in a joystick or hand control may be based on the vehicle's (e.g., lateral or horizontal) distance from the center of the illuminated landing zone. In one example, as the vehicle approaches the landing zone (e.g., at some constant altitude), the hand control will not vibrate unless the distance between the center of the illuminated landing zone and the vehicle begins to increase so that a vibration in the hand control indicates that the vehicle is moving in the wrong direction. If the vehicle continues to move further away from the center of the illuminated landing zone, the degree or amount of vibration increases. If the pilot adjusts the vehicle's direction correctly so that the vehicle moves closer to the center of the illuminated landing zone, the degree or amount of vibration decreases.

In some applications, a pilot manually lands a vehicle once the vehicle is properly positioned above the illuminated landing zone. The computer-visible signals from the landing zone indicator are beneficial in such application because they help the pilot to safely land, even in relatively small landing zones, in dense landing zones (e.g., multiple vehicles share a landing zone), and/or with vehicles with restricted ground views, and so on. Landing without computer-visible signals may require a larger landing zone and/or may be more dangerous because the likelihood is greater that the vehicle will land where or on something the vehicle is not supposed to.

In some embodiments, computer-visible signals output by an on-the-ground landing zone indicator are angled or otherwise directed so that the signals are detected by a sensor or receiver on the vehicle while the vehicle is flying towards the landing zone indicator (e.g., in a forward flight mode). In one human-piloted example, computer-visible signals are used to pinpoint the location of the landing zone indicator and that information is combined with current flight path or positional information in a display. For example, the display may show the location of the landing zone indicator superimposed on real-time video taken from the vehicle to let the pilot know what flight path adjustments (if any) to make to head towards the landing zone indicator. Or, the display may show the location of the landing zone indicator combined with the (e.g., projected) flight path of the vehicle to similarly let the pilot know whether and/or to what degree course correction is needed. In some embodiments, a landing zone indicator is configurable or otherwise adjustable so that the (nominal) angle at which the computer-visible signals are output is adjustable (e.g., between 0°-90°).

Figure 1B:
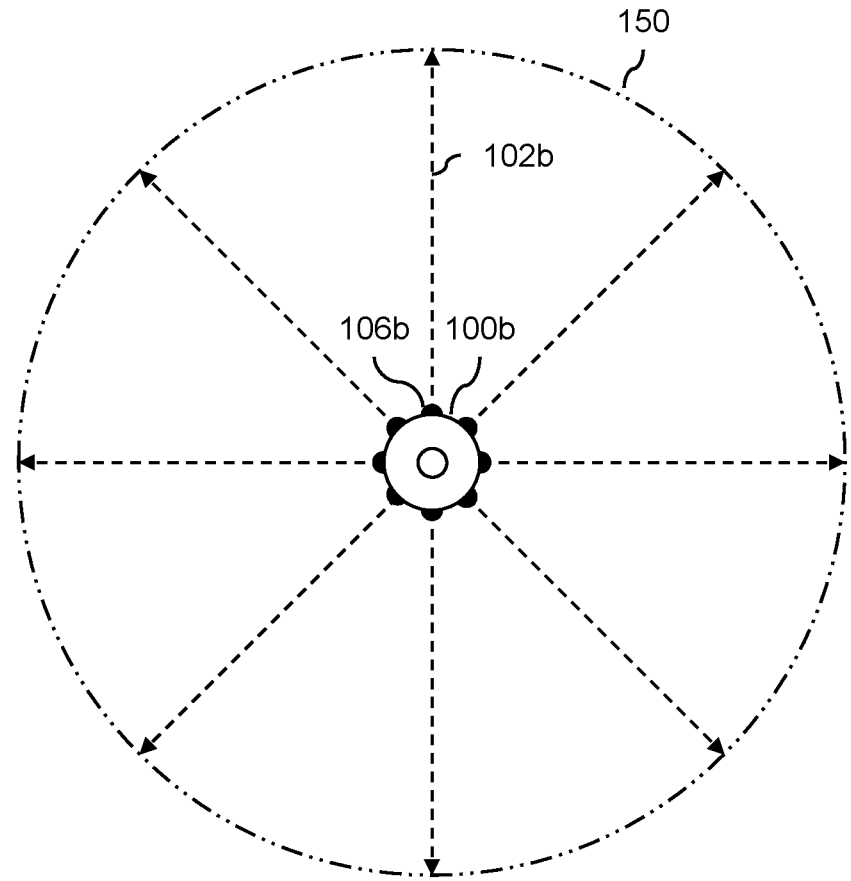
FIG. 1B is a diagram illustrating an embodiment of an on-the-ground landing zone indicator viewed from above.

FIG. 1B is a diagram illustrating an embodiment of an on-the-ground landing zone indicator viewed from above. FIG. 1B continues the example of FIG. 1A. From this view, the circular landing zone (150) (which is illuminated or otherwise demarcated by the human-visible signals (102*b*) that are output by the human vision output components (106*b*) on the on-the-ground landing zone indicator (100*b*)) is visible. The diameter of the circular landing zone (150) is selected to be greater than or equal to the wingspan of the (e.g., (e)VTOL) vehicle that will land in the landing zone plus a safety margin, if desired (e.g., to account for wind gusts, signal noise, errors, etc.). In one example, the diameter of circular landing zone (150) is on the order of 15 feet to fit a single-set multicopter. A person standing outside of the circular landing zone (150) is therefore believed to be in a safe location if an (e)VTOL vehicle were to (e.g., vertically) land in the circular landing zone (150).

In some embodiments, an on-the-ground landing zone indicator is designed to be used with a variety of (e.g., (e)VTOL) vehicles with various wingspans and/or landing zone size needs if desired. For example, a landing zone indicator may include one or more controls (e.g., buttons) that permit the size (e.g., diameter) of an illuminated landing zone to be adjusted (e.g., press a button on the landing zone indicator to toggle or otherwise switch between multiple pre-defined landing zone sizes).

In one example application, the landing zone indicator is used to indicate or illuminate a landing zone for an (e)VTOL vehicle. If (e)VTOL vehicles are to be successfully deployed in more densely populated urban areas, takeoff and landing locations need to be created or built up in such urban areas. With an on-the-ground landing zone indicator (which in this example is portable and battery powered), open spaces and areas (such as parking lots, parks, roofs of buildings, and such) may be quickly and easily converted into takeoff and landing zones for (e)VTOL vehicles. This may be attractive in places where doing construction work (e.g., to install a power supply or install lights in the ground) would be expensive, time consuming, and/or prohibited.

In various embodiments, an appropriate type, number, and/or arrangement of human vision output components (106*a*) is selected so that the illuminated landing zone is more clearly defined or visible, for example even in bright sunlight. For example, some types of light-emitting devices (such as lasers) may be better suited to sunlight and/or for creating a crisper or more clearly defined perimeter.

In some embodiments, an on-the-ground landing zone indicator includes components or accessories (e.g., in addition to and/or separate from the human vision output device) to improve visibility of the illuminated landing zone and/or crispness of the perimeter in sunlight or to aid visibility in some other manner. For example, an on-the-ground landing zone indicator may include a guide or shield to create a more visible landing zone and/or one with a more clearly-defined or crisper boundary, even in sunlight. In some embodiments, an on-the-ground landing zone indicator includes a speaker or other audible output device. For example, in response to a vehicle approaching the landing zone indicator, the speaker may be activated to sound an alarm or other alert that alerts visually-impaired people about an impending landing. An audible alarm or alert may also help in sunlight when an illuminated landing zone is not as visible.

The landing zone indicator system shown here is merely exemplary and is not intended to be limiting. The following figure shows another embodiment where multiple on-the-ground landing zone indicators are used to illuminate and/or demarcate a square landing zone.

Figure 2:
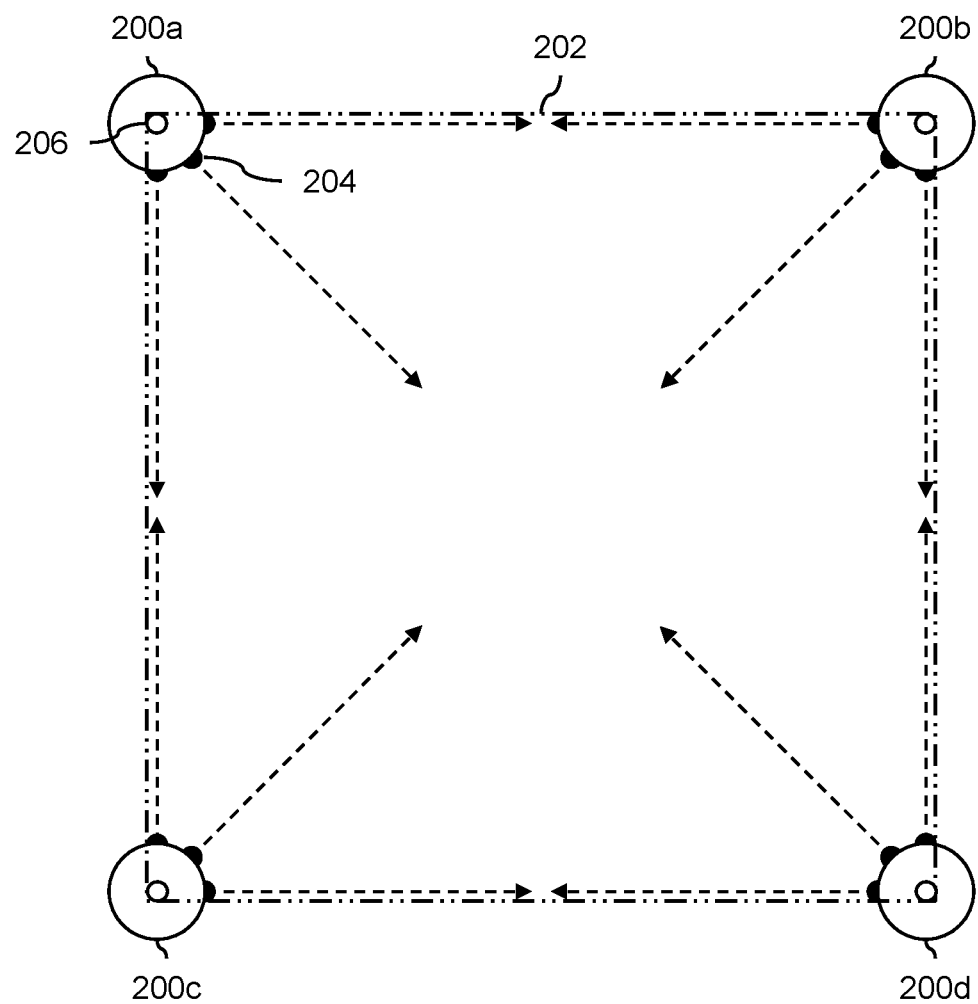
FIG. 2 is a diagram illustrating an embodiment of four on-the-ground landing zone indicators which illuminate a square landing zone.

FIG. 2 is a diagram illustrating an embodiment of four on-the-ground landing zone indicators which illuminate a square landing zone. In this example, four landing zone indicators (200*a*-200*d*) are placed at the corners of the illuminated square landing zone (202). In this example, each side has a length on the order of 15 feet. Each landing zone indicator only needs to output human-visible light over a 90° range so human vision output components (e.g., 204) are only placed over ¼ of the on-the-ground landing zone indicators' side and the landing zone indicators are rotated or otherwise oriented so that the emitted or output human-visible light is directed in the proper direction. In this example, each landing zone indicator also includes a computer vision output device (e.g., 206) on the top of the landing zone indicator. As shown in this example, the number of on-the-ground landing zone indicators used and the shape of the (illuminated) landing zone may vary across embodiments. In some embodiments, the shape of the shape of the (illuminated) landing zone is an outline of the vehicle (e.g., to better convey that a vehicle is going to land in that area, particularly if the vehicle is not yet audible).

As shown in this example, in some embodiments an illuminated landing zone includes a polygon-shaped landing zone where on-the-ground landing zone indicators are located at the vertices (i.e., corners) of the polygon-shaped landing zone. In some applications, having on-the-ground landing zone indicators at the vertices of a polygon-shaped landing zone is desirable because the illuminated landing zone may be more visible in daylight and/or the perimeter of the illuminated landing zone may be sharper and/or clearer. In some applications, it is desirable to have on-the-ground landing zone indicators at the vertices of a polygon-shaped landing zone because it reduces the likelihood of a vehicle landing on one of the landing zone indicators and causing damage to the vehicle and/or the landing zone indicator.

In some applications, it may be desirable to have multiple (e)VTOL vehicles take off and land from the same area. The following figure shows an exemplary system diagram that supports this scenario.

Figure 3:
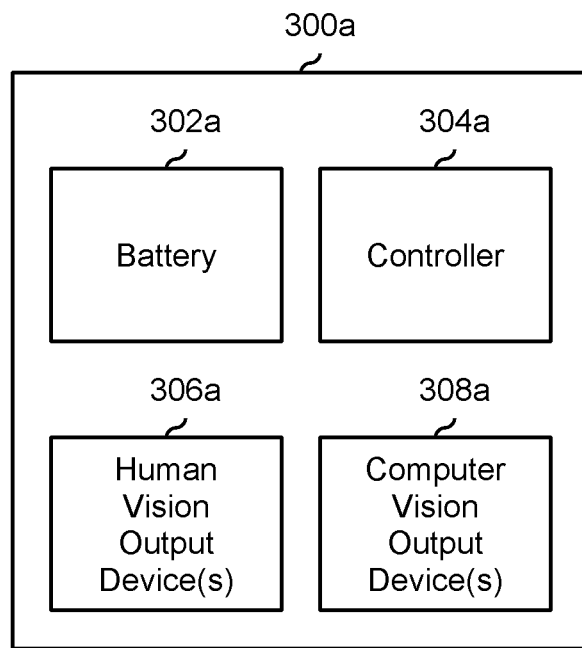
FIG. 3 is a system diagram illustrating an embodiment of co-located landing zone indicators managed by a central controller.
Figure 3:
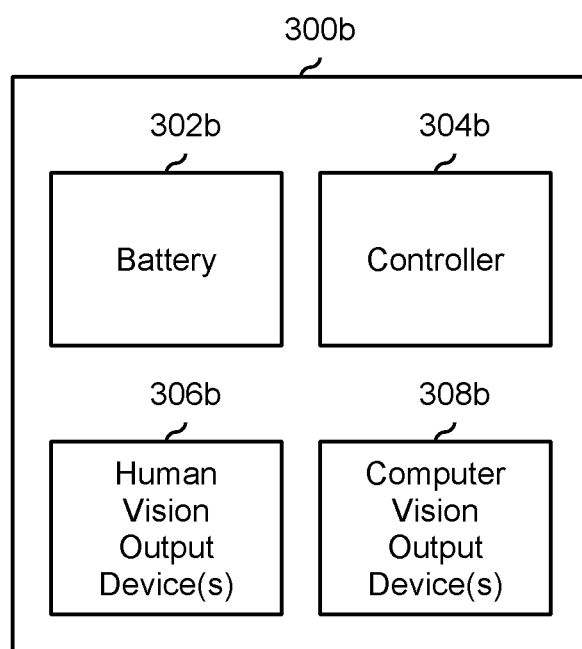

FIG. 3 is a system diagram illustrating an embodiment of co-located landing zone indicators managed by a central controller. In this example, there are two on-the-ground landing zone indicators (300*a* and 300*b*) to permit multiple (e)VTOL vehicles (not shown) to take off and land from the same general area simultaneously. Each landing zone indicator includes a battery (302*a* and 302*b*) and a controller (304*a* and 304*b*) which power and control (respectively) one or more human vision transmitters, emitters, or output devices (306*a* and 306*b*) and one or more computer vision transmitters, emitters, or output devices (308*a* and 308*b*). In some embodiments, the batteries (302*a* and 302*b*) are rechargeable batteries where the landing zone indicators (300*a* and 300*b*) have a plug or port where the batteries can be recharged. For example, landing zone indicators with low batteries may be collected, recharged, and then returned to the area where the landing zones are located.

To manage the shared space and indicate which landing zone a given vehicle should land in, the on-the-ground landing zone indicators (300*a* and 300*b*) are able to toggle or otherwise switch between different human-visible lights and computer-visible lights so that each emits or otherwise outputs unique and/or distinguishable signals. In this example, the two illuminated landing zones (not shown) are illuminated using different colors. A pilot may be instructed to land in the red landing zone or the blue landing zone (as an example) and looks for and lands in the landing zone illuminated with the correct color. In some embodiments, the human-visible lights output or otherwise display different words, images, and/or alphanumeric text (for convenience, referred to collectively as symbols). In one example, the illuminated landing zones are labeled with different numbers (e.g., 1, 2, etc. (to differentiate between them)). In some embodiments, certain colors or symbols are used to indicate the landing state of the various landing zones. For example, red light or the word "closed" may be used to indicate that a particular illuminated landing zone is not available for landing whereas green light or the word "open" may be used to indicate that a particular landing zone is available for landing. In some embodiments, the color, description, etc. is used for ground or air traffic control purposes (e.g., to only let one vehicle be active or in motion in the area at a time to avoid collisions).

The controllers (304a and 304b) may be implemented in a variety of ways to control or configure the human vision output device(s) to emit the appropriate color (or, more generally, human-visible light). In one implementation, a technician presses buttons (or some other control interface) on the first landing zone indicator (300a), the control signals of which are passed to the first controller (304a) which in turn controls the human vision output device(s) (306a), to toggle through various colors until the first landing zone indicator (300a) is displaying the appropriate color (e.g., red). This is repeated on the second landing zone indicator (300b) until the appropriate color (e.g., blue) is displayed.

Similarly, the first computer vision output devices(s) (308a) output a unique or distinguishable infrared signal (e.g., different frequencies of infrared light, different patterns of "blinking" or on-off sequences of infrared light, etc.) compared to the second computer vision output devices(s) (308b). This permits a computer vision receiver, sensor, or processor on a vehicle to identify which landing zone a particular vehicle should land at, or which landing zone to display to a pilot that they should land at.

In some embodiments, the uniquification of the human-visible light output by the human vision output device(s) (306a and 306b) and computer vision signals output by the computer vision output device(s) (308a and 308b) is performed automatically. In one example, as each landing zone indicator is powered on, each controller may wirelessly scan or otherwise search for other landing zone indicators in the vicinity and identify what colors have already been claimed. The controller may then select an unclaimed output signal (e.g., color) that is not currently being output by any other landing zone indicator. This is merely one example and a variety of techniques may be used so that controllers in landing zone indicators are able to determine what types or variations of human-visible light and/or computer vision signals are being used and which ones are not being used.

In some embodiments, an on-vehicle and/or on-the-ground landing zone indicator may be used at takeoff. For example, at night, it may be helpful to illuminate the ground to aid a person getting into the vehicle and one or both types of landing zone indicators may be used for this purpose. Or, if there is more than one vehicle at that location, one or both types of landing zone indicators may be used to indicate which vehicle a person should get into. In one example, one landing zone is illuminated using the corresponding on-vehicle and/or on-the-ground landing zone indicator(s) while the landing zone indicator(s) for the other landing zone are off and do not illuminate that landing zone. Or, if there are multiple people simultaneously getting into vehicles, the landing zones may be illuminated in different colors where each person is told which color landing zone they should go to and get into the vehicle there.

In some embodiments, the underside of an (e)VTOL vehicle has an on-vehicle landing zone indicator. The following figure shows an example of this.

Figure 4:
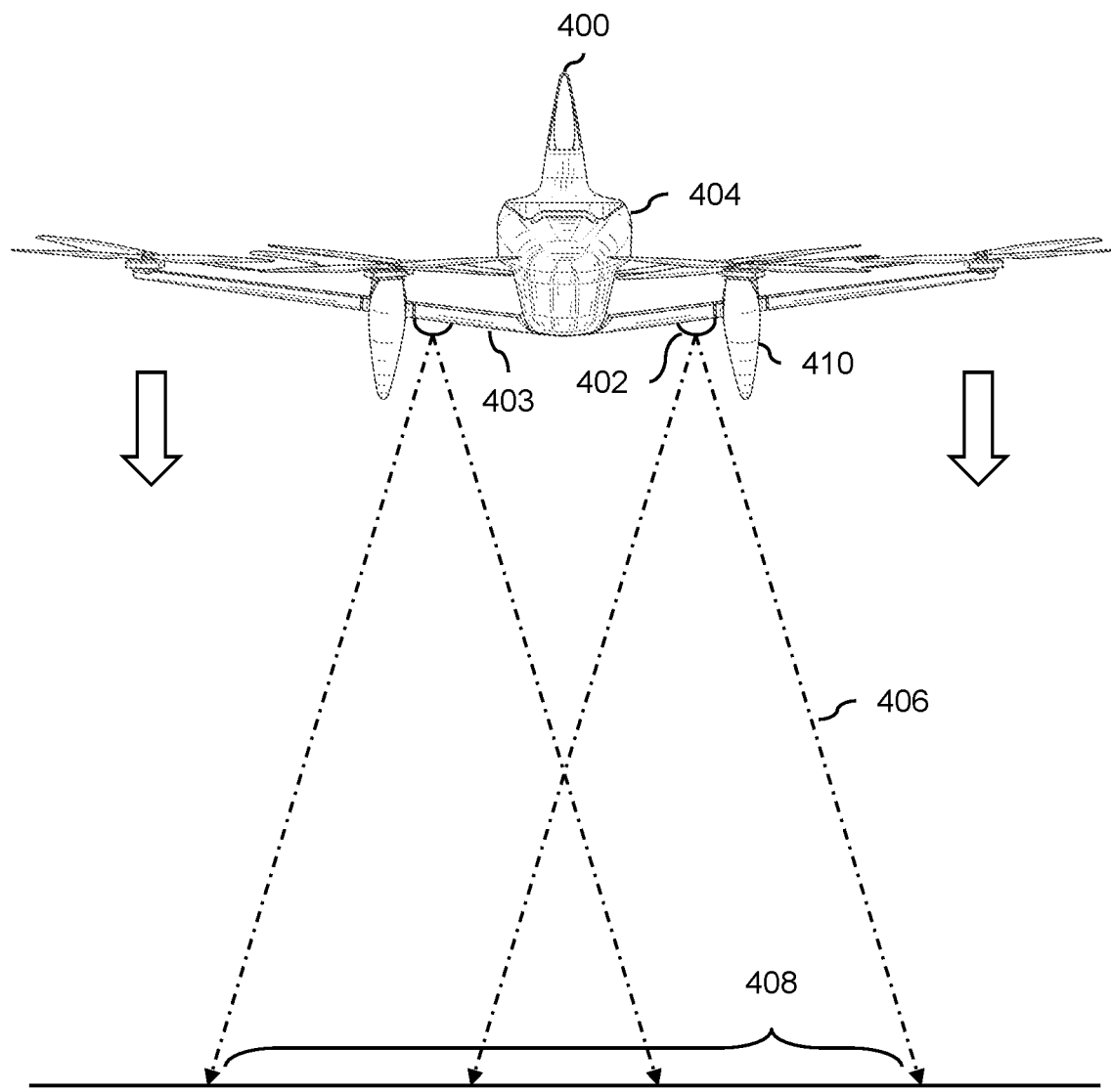
FIG. 4 is a diagram illustrating an embodiment of an (e)VTOL vehicle with an on-vehicle landing zone indicator.

FIG. 4 is a diagram illustrating an embodiment of an (e)VTOL vehicle with an on-vehicle landing zone indicator. In this example, the (e)VTOL vehicle (400) is an unoccupied, autonomously flown vehicle that is in the process of performing a vertical landing. The relatively small size of the (e)VTOL vehicle and its vertical takeoff and landing capabilities permit the vehicle to land in relatively small places and/or in more densely populated urban environments. As described above, the (e)VTOL vehicle may be landing in a parking lot, in a park, or on the rooftop of a building.

In this example, two on-vehicle landing zone indicators (402) are located or otherwise disposed on the underside of booms (403) between the fuselage (404) and floats (410). The landing zone indicators include one or more human vision output devices (not shown) that output human-vision lights (406) which in turn illuminate a landing zone (408) on the ground. In some embodiments, controllers (not shown) in the on-vehicle landing zone indicators (402) control the human vision output devices based on the state (or, more generally, location or altitude) of the vehicle. For example, it would be undesirable to illuminate an area that is not the intended or desired landing zone for that vehicle. To that end, in some embodiments, while the vehicle is operating in a forward flight mode (e.g., at constant altitude and moving within a horizontal plane searching for the proper position directly above the proper or desired landing zone), the on-vehicle landing zone indicators (402) are off or otherwise not emitting or outputting any human-visible light until the vehicle is over the proper or desired landing, at which point a controller turns on the human vision output device(s).

A controller may continue to adjust or change the state or settings of the human vision output device(s) and/or the computer vision output device(s) even after the vehicle is hovering above the proper or desired landing zone, based on the vehicle's altitude (or, more generally, the vehicle's state). In one example, the landing zone indicators (402) output different colors depending upon the altitude of the vehicle. At higher altitudes, the landing zone indicators (402) output yellow or orange light (as an example) so that the landing zone (408) is illuminated with a color associated with a warning or caution and at lower altitudes outputs red so that the illuminated landing zone (408) is illuminated with a color associated with danger.

In various embodiments, a variety of techniques and/or components may be used to keep the size and/or shape of the illuminated landing zone (408) relatively constant as the vehicle lands. In some embodiments, the human vision output devices are able to be tilted or adjusted and the angle of the human vision output devices is adjusted as the vehicle descends. In some embodiments, one or more shutters are adjusted so that a circular aperture gradually opens as the vehicle descends to keep the size of the illuminated landing zone (408) relatively constant.

In some embodiments, an on-vehicle landing zone indicator includes one or more computer-vision output devices. For example, the computer vision signals output by an on-vehicle landing zone indicator may reflect back off the ground and/or off an on-the-ground landing zone indicator and the reflected computer vision signals are received by a computer vision sensor or receiver on the vehicle to help land a vehicle properly in the landing zone.

In various embodiments, an on-vehicle landing zone indicator is powered from a variety of sources. In some cases, an on-vehicle landing zone indicator is an aftermarket system and/or it is undesirable to drill a hole in the skin of the vehicle to power the landing zone indicator using the vehicle's battery so the on-vehicle landing zone indicator has its own battery. For example, the (e)VTOL vehicle shown here (400) is capable of taking off from and landing on water and drilling a hole in the vehicle may be undesirable. In such an embodiment, an on-vehicle landing zone indicator with an internal battery may be desirable to avoid the need to drill a hole into the vehicle. Alternatively, a landing zone indicator may be powered using the vehicle's on-board batteries. For example, the (e)VTOL vehicle shown here (400) stores its batteries in the floats (410) and the positioning of the landing zone indicators relatively close to the floats may shorten the wiring between the batteries in the floats and the landing zone indicators, which is desirable.

Although this example shows on-vehicle landing zone indicators without an on-the-ground landing zone indicator, the two types of landing zone indicators may be used in combination with each other if desired. For example, even if an on-the-ground landing zone indicator were used, the vehicle (400) rests on two floats (410) so that the fuselage (404) is elevated when the (e)VTOL vehicle (400) is on the ground. As a result of this clearance between the on-vehicle landing zone indicator (402) and the ground, neither the on-the-ground landing zone indicator nor the vehicle would be damaged (even) if the on-the-ground landing zone indicator had a not-insubstantial height (e.g., on the order of 6 inches) and the vehicle landed directly on top of the on-the-ground landing zone indicator. To put it another way, it may be desirable to use on-the-ground landing zone indicators in combination with vehicles that have some clearance between the fuselage and the ground when on the ground.

In some embodiments where on-vehicle and on-the-ground landing zone indicators are used together, the controllers communicate with each other. For example, a controller in an on-vehicle landing zone indicator may periodically transmit the altitude or position of the vehicle (e.g., relative to the ground or the on-the-ground landing zone indicators) and the controller in the on-the-ground landing zone indicator uses this information to control its human vision output device(s) and/or its computer vision output device(s). For example, a controller in an on-the-ground landing zone indicator may use the distance or altitude of the vehicle to turn on lights in the on-the-ground landing zone indicators and/or change the color of lights output by an on-the-ground landing zone indicator.

In one of the examples described above, the color of the human-visible light output by an on-the-ground landing zone indicator changes depending upon the altitude of the vehicle (e.g., relative to the on-the-ground landing zone indicator) as the vehicle is landing. The following figure describes this process more formally and/or generally.

Figure 5:
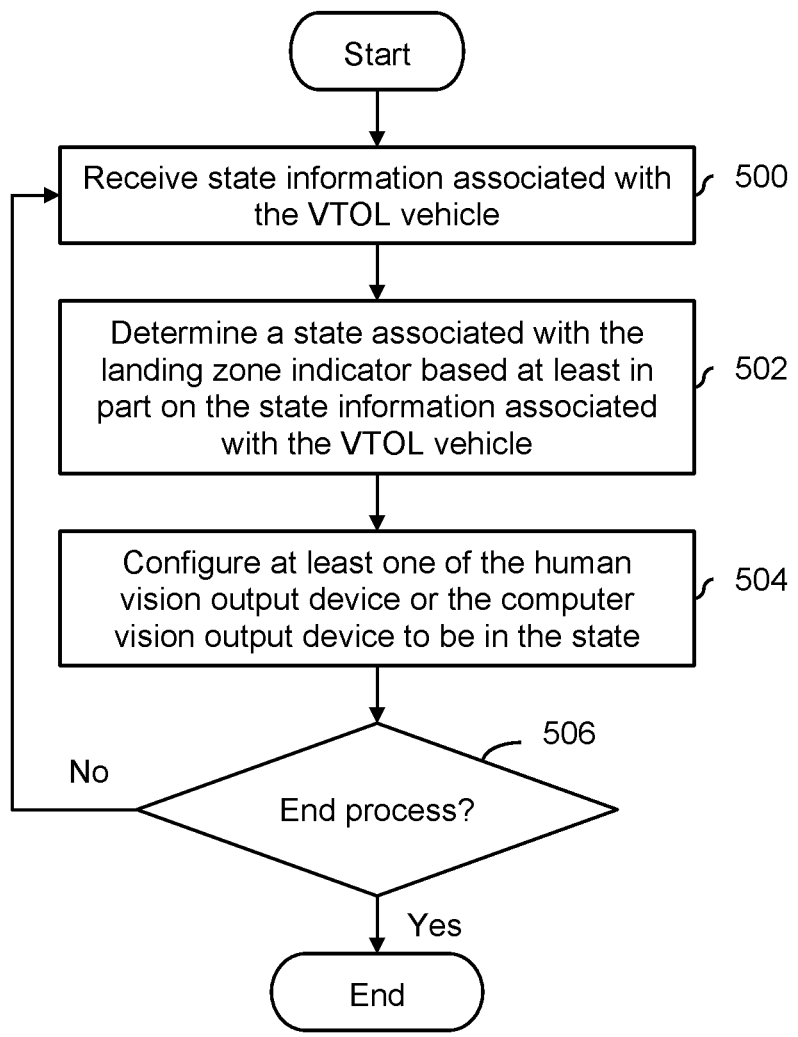
FIG. 5 is a flowchart illustrating an embodiment of a process to control the state of a human vision output device or a computer vision output device based at least in part on vehicle state information.

FIG. 5 is a flowchart illustrating an embodiment of a process to control the state of a human vision output device or a computer vision output device based at least in part on vehicle state information. In some embodiments, the process is performed by a controller in a landing zone indicator. In various embodiments, the process is performed by an on-the-ground landing zone indicator or an on-vehicle landing zone indicator.

At 500, state information associated with the VTOL vehicle is received. In some embodiments, the state information is a state or mode associated with the vehicle's flight, such as flight speed or a state that a flight controller is in (e.g., forward flight mode, hover mode, an automated landing mode, etc.). In some embodiments, the state information is the altitude of the vehicle or the distance of the vehicle from an on-the-ground landing zone indicator.

At 502, a state associated with the landing zone indicator is determined based at least in part on the state information associated with the VTOL vehicle. For example, the state may be a physical state, such as an angle that a computer vision output device should be oriented in (e.g., where the angle or orientation of the computer vision output device is controlled by an actuator). In some embodiments, the state is a state associated with a characteristic or property of human-visible light or a computer vision signal that is output by a human vision output device or a computer vision output device, respectively. One example is whether to turn on one of the output devices, or a color or other property of the light or signal that is output.

At 504, at least one of the human vision output device or the computer vision output device is configured to be in the state. For example, using the first landing zone indicator (300*a*) in FIG. 3 as an example, the controller (304*a*) would configure its human vision output device(s) (306*a*) and/or the computer vision output device(s) (308*a*) to be in the determined state.

At 506, it is determined whether to end the process. For example, the process may continue until some state is reached. In one example, a landing is being performed and the process ends when the vehicle has landed. In some embodiments, it is determined to end the process at step 506 after a certain amount of time has elapsed. For example, to save power, an on-the-ground landing zone indicator may turn off and/or enter a low power state after a certain amount of time has elapsed. If the process does not end, then (e.g., new or updated) state information is received at step 500.

It may be helpful to illustrate some specific examples of FIG. 5. In one example, the landing zone indicator is an on-the-ground landing zone indicator and to save power the human vision output device(s) and computer vision output device(s) are kept in a low(er) power state until a landing is imminent. In some embodiments, a controller in the on-the-ground landing zone indicator periodically scans or checks for a communication from a controller in an on-vehicle landing zone indicator that indicates the vehicle is nearby and will land in its landing zone (e.g., there may be multiple landing zones in the area and a vehicle may land in another landing zone). If such a communication is received or detected (e.g., where the vehicle is in a "nearby will land in my landing zone" state), the controller on the ground turns on the human vision output device(s) and computer vision output device(s) on the ground.

Or, the landing zone indicator may be an on-vehicle landing zone indicator. Suppose that a flight controller in the vehicle has different states associated with different flight modes or flight operations and one such state or mode is an autonomous landing mode (e.g., a state or mode in which the flight controller runs instructions or processes associated with performing an autonomous vertical landing). In some applications it is desirable to have an autonomous process perform the landing because it is safer than having a pilot (who may be inexperienced and/or distracted) perform the landing. In one example, when the flight controller is in such an autonomous landing mode or state, the controller in the on-vehicle landing zone indicator turns on its human vision output device(s) and/or computer vision output device(s).

In another example, the landing zone indicator is an on-the-ground landing zone indicator and the state information associated with the VTOL vehicle is the altitude of the vehicle. It is assumed that the vehicle is hovering above the on-the-ground landing zone indicator. When the vehicle is above some altitude threshold, the human vision output device(s) output(s) yellow or orange light to illuminate the landing zone. When the vehicle descends below the altitude threshold, the human vision output device(s) output(s) red light to illuminate the landing zone.

In yet another example, the landing zone indicator is an on-the-ground landing zone indicator and the state information associated with the VTOL vehicle is position of the vehicle relative to the on-the-ground landing zone indicator. In this example, the computer vision output device is configured to rotate and continually provide a computer vision signal as the vehicle (e.g., in a forward flight mode, flying at a constant altitude) approaches the on-the-ground landing zone, and also while the VTOL vehicle lands vertically (e.g., the computer vision output device begins at some angle θ and then rotates to a vertical 90° angle). Depending upon the position or location of the vehicle, the computer vision output device(s) is/are rotated accordingly (e.g., by controlling an actuator which in turn controls the orientation of the computer vision output device(s)).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A landing zone indicator system, comprising:
   a battery, wherein the battery is configured to power a controller and a human vision output device;
   the controller, wherein the controller is configured to:
      control human-visible light that is output by the human vision output device;
      receive state information associated with a vertical takeoff and landing (VTOL) vehicle after determining that the VTOL vehicle is hovering above a proper landing zone, wherein the state information relates to an altitude of the VTOL vehicle;
      determine a state associated with the landing zone indicator system based at least in part on the state information associated with the VTOL vehicle; and
      configure at least one of the human vision output device or a computer vision output device to be in the state, wherein:
         the configuring of the at least one of a human vision output device or a computer vision output device to be in the state includes to:
            determine whether the altitude is equal to or less than an altitude threshold:
            in response to a determination that the altitude is equal to or less than the altitude threshold, change the state of the at least one output device from outputting human-visible light having a first color to outputting human-visible light having a second color and/or from outputting computer vision signal having a first signal to outputting computer vision signal having a second signal;
   the computer vision output device that is configured to output a computer vision signal; and
   the human vision output device, wherein the human-visible light output by the human vision output device generates an illuminated landing zone for the VTOL vehicle.

2. The landing zone indicator system recited in claim 1, wherein:
   the landing zone indicator system further includes an on-the-ground landing zone indicator system; and
   the illuminated landing zone includes a circular landing zone and the on-the-ground landing zone indicator system is located at a center of the circular landing zone.

3. The landing zone indicator system recited in claim 1, wherein:
   the landing zone indicator system further includes an on-the-ground landing zone indicator system; and
   the illuminated landing zone includes a polygon-shaped landing zone and the on-the-ground landing zone indicator system is located at a vertex of the polygon-shaped landing zone.

4. The landing zone indicator system recited in claim 1, wherein the landing zone indicator system further includes an on-vehicle landing zone indicator system.

5. The landing zone indicator system recited in claim 1, wherein:
   the illuminated landing zone is a first illuminated landing zone in a plurality of illuminated landing zones;
   the first illuminated landing zone is generated by human-visible light output having a first property; and
   a second illuminated landing zone in the plurality of illuminated landing zones is generated by human-visible light output having a second property that is different from the first property.

6. The landing zone indicator system recited in claim 1, wherein:
   the illuminated landing zone is a first illuminated landing zone in a plurality of illuminated landing zones;
   the first illuminated landing zone is generated by human-visible light output having a first property;
   a second illuminated landing zone in the plurality of illuminated landing zones is generated by human-visible light output having a second property that is different from the first property; and
   the first property and the second property include a first color and a second color, respectively.

7. The landing zone indicator system recited in claim 1, wherein:
   the illuminated landing zone is a first illuminated landing zone in a plurality of illuminated landing zones;
   the first illuminated landing zone is generated by human-visible light output having a first property;
   a second illuminated landing zone in the plurality of illuminated landing zones is generated by human-visible light output having a second property that is different from the first property; and
   the first property and the second property include a first symbol and a second symbol, respectively.

8. The landing zone indicator system recited in claim 1, wherein:
   the landing zone indicator system further includes the computer vision output device that is configured to output the computer vision signal; and
   the controller is further configured to:
      receive state information associated with the VTOL vehicle;

determine a state associated with the landing zone indicator system based at least in part on the state information associated with the VTOL vehicle; and
configure at least one of the human vision output device or the computer vision output device to be in the state.

9. The landing zone indicator system recited in claim 1, wherein:
the landing zone indicator system further includes the computer vision output device that is configured to output the computer vision signal; and
the controller is further configured to:
receive state information associated with the VTOL vehicle;
determine a state associated with the landing zone indicator system based at least in part on the state information associated with the VTOL vehicle; and
configure at least one of the human vision output device or the computer vision output device to be in the state, wherein:
the state information associated with the VTOL vehicle includes a flight controller in the VTOL vehicle being in an autonomous landing mode; and
configuring includes turning on at least one of the human vision output device or the computer vision output device.

10. A method, comprising:
using a battery to power a controller and a human vision output device, wherein the battery, the controller, and the human vision output device are included in a landing zone indicator system;
using the controller to:
control human-visible light that is output by the human vision output device;
receive state information associated with a vertical takeoff and landing (VTOL) vehicle after determining that the VTOL vehicle is hovering above a proper landing zone, wherein the state information relates to an altitude of the VTOL vehicle;
determine a state associated with the landing zone indicator system based at least in part on the state information associated with the VTOL vehicle; and
configure at least one of the human vision output device or a computer vision output device to be in the state, wherein:
the configuring of the at least one of a human vision output device or a computer vision output device to be in the state includes to:
determine whether the altitude is equal to or less than an altitude threshold;
in response to a determination that the altitude is equal to or less than the altitude threshold, change the state of the at least one output device from outputting human-visible light having a first color to outputting human-visible light having a second color and/or from outputting computer vision signal having a first signal to outputting computer vision signal having a second signal;
using the computer vision output device that is configured to output a computer vision signal; and
using the human vision output device to generate an illuminated landing zone for a vertical takeoff and landing (VTOL) vehicle using the human-visible light output by the human vision output device.

11. The method recited in claim 10, wherein:
the landing zone indicator system further includes an on-the-ground landing zone indicator system; and
the illuminated landing zone includes a circular landing zone and the on-the-ground landing zone indicator system is located at a center of the circular landing zone.

12. The method recited in claim 10, wherein:
the landing zone indicator system further includes an on-the-ground landing zone indicator system; and
the illuminated landing zone includes a polygon-shaped landing zone and the on-the-ground landing zone indicator system is located at a vertex of the polygon-shaped landing zone.

13. The method recited in claim 10, wherein the landing zone indicator system further includes an on-vehicle landing zone indicator system.

14. The method recited in claim 10, wherein:
the illuminated landing zone is a first illuminated landing zone in a plurality of illuminated landing zones;
the first illuminated landing zone is generated by human-visible light output having a first property; and
a second illuminated landing zone in the plurality of illuminated landing zones is generated by human-visible light output having a second property that is different from the first property.

15. The method recited in claim 10, wherein:
the illuminated landing zone is a first illuminated landing zone in a plurality of illuminated landing zones;
the first illuminated landing zone is generated by human-visible light output having a first property;
a second illuminated landing zone in the plurality of illuminated landing zones is generated by human-visible light output having a second property that is different from the first property; and
the first property and the second property include a first color and a second color, respectively.

16. The method recited in claim 10, wherein:
the illuminated landing zone is a first illuminated landing zone in a plurality of illuminated landing zones;
the first illuminated landing zone is generated by human-visible light output having a first property;
a second illuminated landing zone in the plurality of illuminated landing zones is generated by human-visible light output having a second property that is different from the first property; and
the first property and the second property include a first symbol and a second symbol, respectively.

* * * * *